United States Patent
Peddada et al.

(10) Patent No.: US 12,242,618 B2
(45) Date of Patent: Mar. 4, 2025

(54) MULTI-TENANT CRYPTOGRAPHY IMPLEMENTATION COMPLIANCE

(71) Applicant: Salesforce, Inc., San Francisco, CA (US)

(72) Inventors: Prasad Peddada, Alameda, CA (US); Glenn Martin Brunette, Jr., Yardley, PA (US)

(73) Assignee: Salesforce, Inc., San Francisco, CA (US)

( * ) Notice: Subject to any disclaimer, the term of this patent is extended or adjusted under 35 U.S.C. 154(b) by 484 days.

(21) Appl. No.: 17/645,251

(22) Filed: Dec. 20, 2021

(65) Prior Publication Data

US 2023/0195905 A1 Jun. 22, 2023

(51) Int. Cl.
| | |
|---|---|
| *H04L 9/40* | (2022.01) |
| *G06F 9/455* | (2018.01) |
| *G06F 21/57* | (2013.01) |
| *G06F 21/60* | (2013.01) |

(52) U.S. Cl.
CPC ........ *G06F 21/602* (2013.01); *G06F 9/45558* (2013.01); *G06F 21/57* (2013.01); *H04L 63/10* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 10,467,422 | B1* | 11/2019 | Roth | G06F 21/602 |
| 11,790,092 | B1* | 10/2023 | Chakrabarti | G06F 21/604 |
| 2010/0192139 | A1* | 7/2010 | Titzer | G06F 9/485 |
| | | | | 717/151 |
| 2010/0199104 | A1* | 8/2010 | Van Rijnswou | G06F 21/72 |
| | | | | 713/189 |
| 2012/0260231 | A1* | 10/2012 | Kawaba | G06F 11/3419 |
| | | | | 717/106 |
| 2012/0266229 | A1* | 10/2012 | Simone | H04L 63/08 |
| | | | | 726/5 |
| 2012/0278425 | A1* | 11/2012 | Maxted | H04L 63/0281 |
| | | | | 709/217 |
| 2014/0165030 | A1* | 6/2014 | Chevallier-Mames | |
| | | | | G06F 21/14 |
| | | | | 717/110 |
| 2014/0289535 | A1* | 9/2014 | Gan | H04L 9/32 |
| | | | | 713/189 |

(Continued)

*Primary Examiner* — Khang Do
(74) *Attorney, Agent, or Firm* — Holland & Hart LLP

(57) ABSTRACT

Methods, systems, apparatuses, devices, and computer program products are described. A virtual machine may receive, from an application associated with a tenant, a request to perform a cryptographic operation for the application at the virtual machine. Based on receiving the request, the virtual machine may determine that the tenant is limited to using a designated set of cryptographic operations in accordance with a cryptographic operation validation policy associated with the tenant. In some examples, the virtual machine may identify a designated version of the cryptographic operation, from the designated set of cryptographic operations, that corresponds to the cryptographic operation indicated by the request in satisfaction of the cryptographic operation validation policy. The virtual machine may execute the designated version of the cryptographic operation and return a result of the execution to the application.

20 Claims, 11 Drawing Sheets

(56) References Cited

U.S. PATENT DOCUMENTS

| | | | | |
|---|---|---|---|---|
| 2014/0330869 | A1* | 11/2014 | Factor | G06F 21/6281 |
| | | | | 707/783 |
| 2015/0358161 | A1* | 12/2015 | Kancharla | H04L 9/3234 |
| | | | | 713/164 |
| 2016/0048689 | A1* | 2/2016 | Wiener | G06F 21/602 |
| | | | | 713/189 |
| 2016/0182470 | A1* | 6/2016 | Rubin | H04L 63/20 |
| | | | | 713/168 |
| 2016/0323110 | A1* | 11/2016 | Campagna | H04L 63/06 |
| 2018/0114039 | A1* | 4/2018 | Sion | H05K 1/0275 |
| 2018/0167293 | A1* | 6/2018 | Manov | G06F 11/079 |
| 2018/0255101 | A1* | 9/2018 | Adam | H04L 9/3247 |
| 2019/0044927 | A1* | 2/2019 | Sood | H04L 63/083 |
| 2019/0215152 | A1* | 7/2019 | Wang | H04L 9/088 |
| 2019/0236316 | A1* | 8/2019 | Watkins | H04L 9/3236 |
| 2020/0204463 | A1* | 6/2020 | Guan | G06F 21/604 |
| 2020/0210216 | A1* | 7/2020 | Boilen | G06F 9/45508 |
| 2020/0310849 | A1* | 10/2020 | Laurence | G06F 9/5077 |
| 2020/0334304 | A1* | 10/2020 | Reddy Vennapusa | |
| | | | | G06F 16/958 |
| 2020/0349559 | A1* | 11/2020 | Setia | G06Q 20/367 |
| 2021/0372343 | A1* | 12/2021 | Dölker | F02D 41/22 |
| 2022/0138349 | A1* | 5/2022 | Saarinen | H04L 9/0631 |
| | | | | 713/192 |
| 2023/0027329 | A1* | 1/2023 | Durham | G06F 21/602 |
| 2023/0068521 | A1* | 3/2023 | Wang | G06F 21/602 |
| 2024/0113898 | A1* | 4/2024 | Er | H04L 9/0643 |

* cited by examiner

MULTI-TENANT CRYPTOGRAPHY IMPLEMENTATION COMPLIANCE

FIELD OF TECHNOLOGY

The present disclosure relates generally to database systems and data processing, and more specifically to tenant-aware cryptography implementations in multi-tenant applications.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some examples, an organization or a tenant may implement a cryptographic service to provide protection to information and data. For example, some information and data corresponding to the CRM solutions (e.g., sales and marketing data, communication records, and the like) may at times be protected through cryptographic means. In some other examples, a government organization (e.g., a federal, state, or local government, a government contractor, some commercial entity), may require organizations (e.g., government or private organizations) to protect the confidentiality and integrity of information through cryptographic means. That is, the organization may store, manage, modify, or access data that is to be secured using a cryptographic procedure that complies with a government standard.

The cloud platform (or another platform) may support virtual machines that execute cryptographic operations for applications. In some examples, an organization or a tenant may use a cryptographic operation that is compliant with a cryptographic operation validation policy. Validating the compliance of the cryptographic operation may ensure that the cryptographic operation is implemented correctly. However, properly implementing compliant cryptography may be difficult. For example, compliant behavior may be embedded into software (e.g., hard coded), which may not apply to software that is developed externally (e.g., by a third party). As such, the externally-developed software may lack compliance with the cryptographic operation validation policy. In another example, even if compliance with the cryptographic operation validation policy is implemented in an underlying security policy file at the virtual machine, a software developer may override the implementation by hard coding different methods that may be non-compliant. As such, compliance with the cryptographic operation validation policy may be an all-or-nothing implementation, which may limit a tenant's ability to support compliance in particular situations, decrease workflow efficiencies, increase computing resource overhead, and decrease security compliance for some vendors.

DETAILED DESCRIPTION

Figure 1:
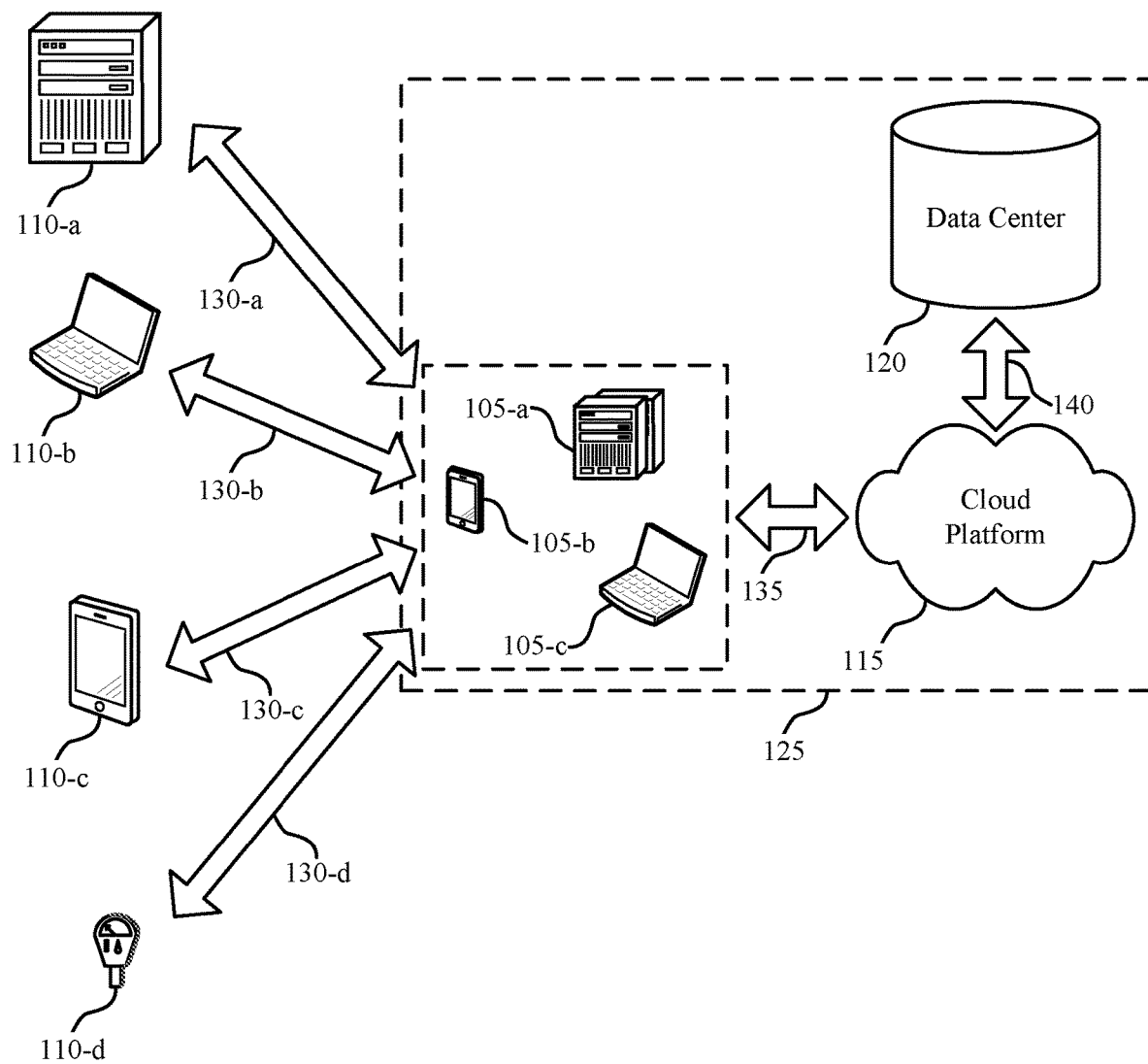
FIG. 1 illustrates an example of a data processing system that supports tenant-aware cryptography implementations in multi-tenant applications in accordance with aspects of the present disclosure.

Techniques described herein supports compliance of different cryptographic operations with a cryptographic operation validation policy. A cryptographic operation may include the use of different cryptographic implementations (e.g., different software used to implement the cryptographic functionality) and different configurations of cryptographic implementations. An organization (e.g., a government organization) or a tenant may implement a cryptographic service to provide protection to information and data. In some examples, the organization or tenant may implement a set of cryptographic operation (e.g., including a cryptographic implementation, a cryptographic service, or any combination thereof) that satisfies a cryptographic operation validation policy (e.g., Federal Information Processing Standard (FIPS) Publication 140 (FIPS 140)) to ensure compliant implementation of the cryptographic operation.

In some examples, a single run-time configuration setting may be used to control whether compliant behavior (e.g., compliance with the cryptographic operation validation policy) is enabled or disabled depending on a particular environment. For example, using the described techniques, a tenant may initialize and use a compliant cryptographic operation regardless of how the corresponding software may be developed and implemented (e.g., whether the software is developed in-house or by a third party). In some examples, to further enable or disable compliance conditionally on a per-tenant basis, an application may be configured to support compliant behavior. Additionally or alternatively, a tenant may enable compliance with the cryptographic operation validation policy regardless of how underlying security policy configurations files may be implemented.

The described techniques support using tenant-aware cryptography implementations in multi-tenant applications at a virtual machine. In some cases, the described techniques support a tenant enabling or disabling compliant behavior depending on a particular environment and use case. The compliant behavior may be implemented regardless of the underlying application code. As such, these techniques thereby support improved workflow efficiencies and improved security.

In some examples, a virtual machine may receive a request to perform a cryptographic operation (e.g., a cryptographic implementation) from an application associated with a tenant. Based on receiving the request, the virtual machine may determine that the tenant is limited to using a designated set of cryptographic operations in accordance with a cryptographic operation validation policy (e.g., FIPS 140), where the designated set of cryptographic operations may be validated in accordance with the cryptographic operation validation policy. In some examples, the virtual machine may identify a designated version of the cryptographic operation from the designated set of cryptographic operations that corresponds to the cryptographic operation indicated by the request in satisfaction of the cryptographic operation validation policy. That is, the designated version of the cryptographic operation may be implemented in compliance with the cryptographic operation validation policy. The virtual machine may execute the designated version of the cryptographic operation and return a result of executing the cryptographic operation to the application.

In some cases, the virtual machine may query a thread local variable based on receiving the request to perform the cryptographic operation. The thread local variable may include a reference to a cryptographic provider, which may be used to execute the requested cryptographic operation in compliance with the cryptographic operation validation policy. In some examples, the virtual machine may determine that the tenant is limited to using the designated set of cryptographic operations based on querying the thread local variable. Upon returning the result of executing the designated version of the cryptographic operation to the application, the virtual machine may release a thread associated with the execution and the thread local variable.

Aspects of the disclosure are initially described in the context of an environment supporting various services, such as applications, an on-demand database service, or other types of services. Aspects of the disclosure are then described in the context of computing architectures and process flows. Aspects of the disclosure are further illustrated by and described with reference to apparatus diagrams, system diagrams, and flowcharts that relate to tenant-aware cryptography implementations in multi-tenant applications.

FIG. 1 illustrates an example of a system 100 for cloud computing that supports tenant-aware cryptography implementations in multi-tenant applications in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to particular applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 and/or subsystem 125 may support an application server that may be used for validating compliance of different cryptographic operations with a cryptographic operation validation policy. In some examples, the application server may support a virtual machine that may support execution of an application and may execute a cryptographic operation in support of the application. An organization or a tenant (e.g., client 105) may use a set of a cryptographic operations (e.g., a cryptographic implementations) in accordance with a cryptographic operation validation policy to ensure compliant implementation of the cryptographic operation. For examples, some organizations (e.g., government organizations) may be required to use compliant cryptographic operations.

Some organizations or tenants may use cryptographic operations that lack compliance with a cryptographic operation validation policy (e.g., for commercial applications that are not required to be compliant). In such cases, using compliant cryptographic operations may impose performance, functionality, or other limitations due to inherent compliance requirements, processes, and certification timelines associated with the cryptographic operation validation policy. In some other examples, using cryptographic operations that comply with the cryptographic operation validation policy alone may lack sufficiency. For example, if a tenant is required to be compliant, then a cryptographic operation may be configured to ensure it operates in accordance with the cryptographic operation validation policy. However, such custom configurations may make it difficult to determine whether different applications or services are operating in a compliant or non-compliant manner.

Implementing cryptographic libraries (e.g., Java cryptographic libraries) that are compliant with a cryptographic operation validation policy may be difficult. In some examples, software developers may determine how to write code in a manner that leverages compliant cryptographic libraries in a compliant manner. However, software developers may lack training in implementing compliant cryptography, which may lead to non-compliant or complicated code that is difficult to implement, validate, debug, or any combination thereof. In some examples, a software developer may embed compliant cryptographic libraries in code, for example by hard coding particular parameters directly into software. For example, in Java, a developer may specify a compliant cryptographic operation provider (e.g., Bouncy Castle FIPS (BCFIPS), Advanced Encryption Standard (AES), Galois/Counter Mode (GCM)) by adding additional parameters to a method invocation (e.g., changing Cipher.getInstance ("AES/GCM/NoPadding") to Cipher.getInstance ("AES/GCM/NoPadding", "BCFIPS"). The addition of the parameters may instruct the software to use a cryptographic provider (e.g., a FIPS 140 compliant provider such as BCFIPS) in place of a default cryptographic provider the software developer may otherwise use. In some examples, the cryptographic provider (e.g., BCFIPS) may also be registered as a security provider elsewhere to be used in this manner.

To embed compliant cryptographic libraries in code, a software developer may write or modify source code to leverage a compliant cryptographic operation provider by name. Depending on the size of the code base, the software developer may use a considerable amount of effort to write or modify the code, which may be executable if all relevant source code is under the control of the software developer (e.g., if the code is developed in-house). However, the software developer may use software developed by third parties and open source communities, which may have been written without a concern for a compliance policy. In addition, for closed-source software, a software developer may be unable to implement changes, for example, to add compliant behavior. For open-source software, changes may be unaccepted or may be accepted in an untimely manner by an open-source software developer. Additionally or alternatively, embedding compliant cryptographic libraries in code may cause all deployment scenarios to be compliant. However, compliance may be unnecessary in some situations, and forcing compliance with the cryptographic operation validation policy in this manner may reduce functionality and performance of the corresponding software.

In some examples, cryptographic libraries that are compliant with the cryptographic operation validation policy may be established by policy. For example, a FIPS 140 compliant cryptographic provider may be established as prioritized for use through its inclusion and placement in a security policy configuration file. In some cases, cryptographic providers listed first may be used in priority order based upon cryptographic functions the cryptographic providers offer. Secondary or other providers may be used if they deliver cryptographic functions that may be unavailable from earlier providers. For example, in Java, the Java Secure Sockets Extension (JSSE) may require that a Sun provider be used in a compliance mode.

Additionally or alternatively, establishing compliant cryptographic libraries by policy may reduce performance of the corresponding software. For example, by attempting to achieve compliance using a security policy file (e.g., a Java security policy file), the compliant operation of the software may depend on the correct configuration of the policy file. That is, adding, removing, or adjusting an order of cryptographic providers may invalidate the compliance in different ways. For example, mapping cryptographic functions to cryptographic providers (e.g., given that not all providers may implement the same set of cryptographic functions), a change in the software may lead to one or more cryptographic functions being implemented by non-compliant providers. Without an extensive review of the software, it may be difficult to confirm if such a case exists. Additionally or alternatively, a software developer may hard code methods to use a specific provider (e.g., Cipher.getInstance ("AES/GCM/NoPadding", "SUN"). As such, Java may use the hard-coded value to override the policy. The use of a policy file or the use of hard-coded values may not be easily discovered in closed source software.

Embedding compliant cryptographic libraries in code or establishing the compliant cryptographic libraries by policy may result in an all-or-nothing implementation of compliance with the cryptographic operation validation policy. For example, compliant behavior may be either universally enabled or disabled across an entire virtual machine. In some cases, non-approved (e.g., non-compliant) cryptographic functions may be desirable. However, various implementations may be prohibited when compliance is enabled (e.g., when using some hashing algorithms for non-security purposes). In some examples, compliance may limit the use of cryptography implemented for various purposes, and the all-or-nothing implementation may prevent supporting these use cases. Additionally or alternatively, enabling compliance for all tenants on the virtual machine may impact those tenants' ability to use some cryptographic functions within their own instance of the application or may limit performance of applications used by some tenants. As such, the all-or-nothing implementation may limit a tenant's ability to support compliance should a unique situation require it, such as tenants in more security conscious or regulated industries.

Techniques described herein support using different cryptographic operations that are compliant with a cryptographic operation validation policy. A cryptographic operation may include the use of different cryptographic implementations (e.g., different software used to implement the cryptographic functionality) and different configurations of cryptographic implementations. An organization (e.g., a government organization) or a tenant (e.g., a cloud client 105) may implement a cryptographic service to provide protection to particular information and data. In some examples, the organization or tenant may use cryptographic operations (e.g., including cryptographic implementations, cryptographic services, or any combination thereof) that are validated in accordance with a cryptographic operation validation policy (e.g., FIPS 140).

In some examples, a single run-time configuration setting may be used to control whether compliance with the validation policy is enabled or disabled such that a tenant may enable or disable compliance with the cryptographic operation validation policy depending on a particular environment. For example, using the described techniques, a tenant may initialize and use a compliant cryptographic operation regardless of how the corresponding software may be developed and implemented (e.g., whether the software is developed in-house or by a third party). In some examples, to further enable or disable compliance conditionally on a per-tenant basis or application basis, an application may be modified to enable or disable compliance. Additionally or alternatively, a tenant may enable compliance with the cryptographic operation validation policy regardless of how underlying security policy configurations files may be implemented.

The cloud platform 115 may support an application server supporting a virtual machine (e.g., a Java virtual machine (JVM)) and cryptographic operation logic to validate that different cryptographic operations are compliant with a cryptographic operation validation policy. In some examples, a virtual machine may receive a request to perform a cryptographic operation (e.g., a cryptographic implementation) from an application associated with a tenant. Based on receiving the request, the virtual machine may determine that the tenant is limited to using a designated set of cryptographic operations in accordance with a cryptographic operation validation policy (e.g., FIPS 140). That is, the virtual machine (e.g., cryptographic operation logic) may determine that the tenant is to use compliant operations. In some examples, the virtual machine may identify a designated version of the cryptographic operation from the designated set of cryptographic operations that corresponds to the cryptographic operation indicated by the request in satisfaction of the cryptographic operation validation policy. That is, the designated version of the cryptographic operation may be implemented in compliance with the cryptographic operation validation policy. The virtual machine may execute the designated version of the cryptographic operation and return a result of executing the cryptographic operation to the application.

Tenant-aware cryptography implementations in multi-tenant applications may support improved workflow efficiencies and reduced processing overhead by ensuring that tenants properly implement cryptographic operations. For example, as the techniques described herein support enabling or disabling compliance with the cryptographic operation validation policy based on the particular environment, the techniques may support increased compliance with security requirements (e.g., federal requirements) in cryptography implementations by enabling validation policy compliant cryptographic operations regardless of whether they are developed in-house or by an external organization. As another example, as the techniques described herein support ensuring that compliance with the validation policy is enabled regardless of how underlying security policy configuration files are implemented, the techniques may improve functionality of cryptographic operations. In addition, the described techniques may support improving the effectiveness of cryptographic operations following the validation policy by enabling the compliance on a tenant-by-tenant basis. As the compliant operations may be implemented at the virtual machine level, compliance may be activated regardless of the application code that is calling or requesting the cryptographic operation.

It should be appreciated by a person skilled in the art that one or more aspects of the disclosure may be implemented in a system 100 to, additionally or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
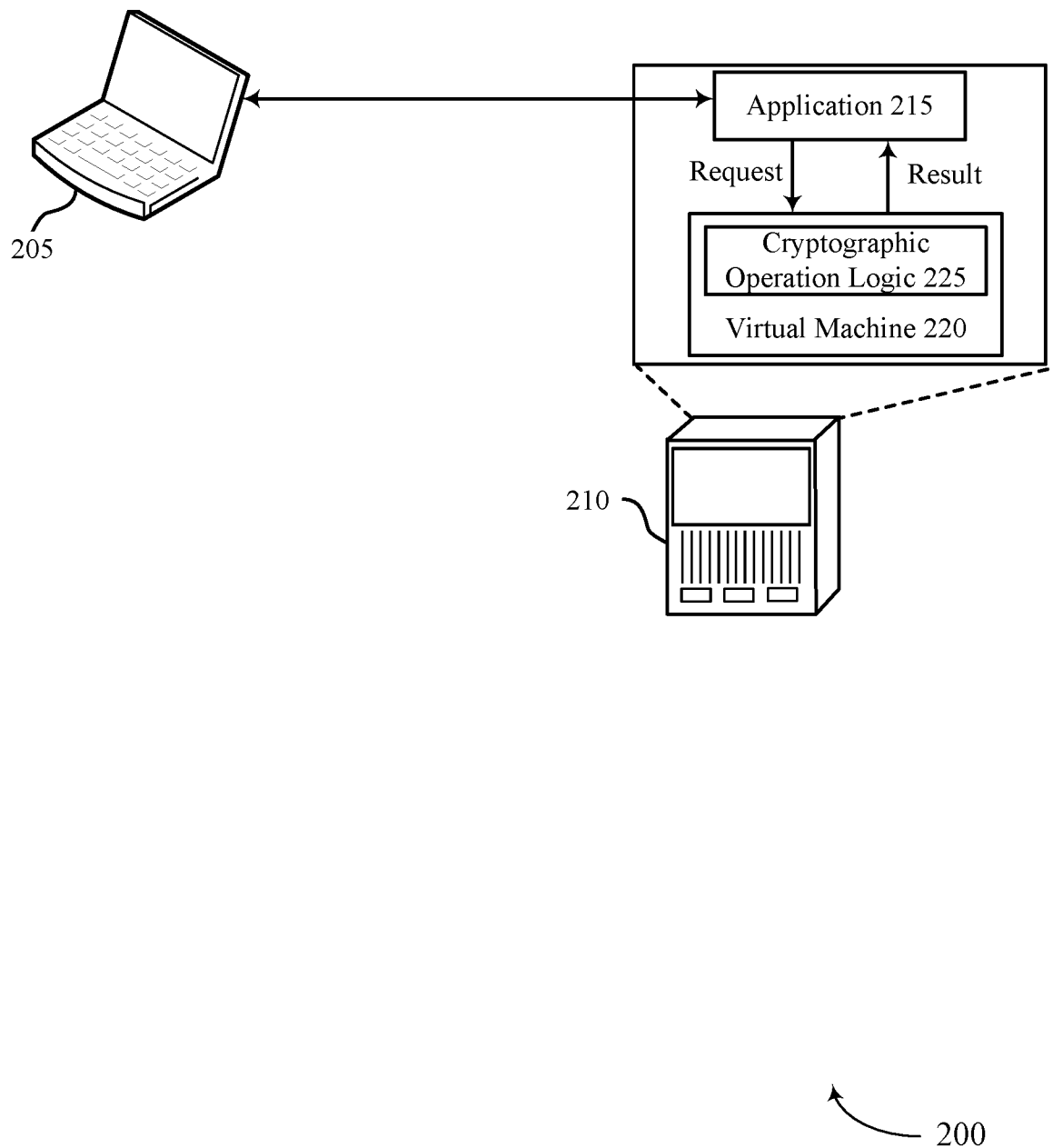
FIG. 2 illustrates an example of a computer architecture that supports tenant-aware cryptography implementations in multi-tenant applications in accordance with aspects of the present disclosure.

FIG. 2 illustrates an example of a computing architecture 200 that supports tenant-aware cryptography implementations in multi-tenant applications in accordance with aspects of the present disclosure. The computing architecture 200 may include a user device 205 (e.g., an example of a cloud client 105 as described with reference to FIG. 1) in communication with an application server 210. The application server 210 may support an application 215, virtual machine 220, and cryptographic operation logic 225. In some cases, the application server 210 may represent aspects of the cloud platform 115 and the subsystem 125 of FIG. 1. In some examples, the virtual machine 220 may include a computer and an operating system, a hardware-based virtual machine (e.g., Type 1 hypervisor), a software-based virtual machine (e.g., Type 2 hypervisor), an operating system-based virtual container (e.g., Docker container), an application-based virtual machine (e.g., a JVM), or another type of virtual machine, any combination thereof. The computing architecture 200 may support tenant-aware cryptography implementations in multi-tenant applications such that cryptographic operations may be directed to a particular set of cryptographic operations that are compliant with a cryptographic operation validation policy.

In some cases, an organization (e.g., a federal, state, or local government, a government contractor, some commercial entity) or a tenant may store, manage, modify, or access data that is to be secured using a compliant cryptographic procedure. In some examples, a tenant may use the user device 205 for interaction with the application 215 that may request a cryptographic operation to be executed at the virtual machine 220 (e.g., a JVM).

Based on receiving the request to perform a cryptographic operation, the virtual machine 220 may determine that the tenant is limited to using a designated set of cryptographic operations in accordance with the cryptographic operation validation policy, where the designated set of cryptographic operations may be validated in accordance with the cryptographic operation validation policy. For example, the virtual machine 220 may execute cryptographic operation logic 225 that is used to intercept requests, determine that the requests correspond to cryptographic operations, identify that the tenant is limited to using a designated set of cryptographic operations, and identify the corresponding designated cryptographic operation. (e.g., a designated version of the cryptographic operation) from the designated set of cryptographic operations. Thus, the cryptographic operation logic 225 may maintain a listing of requestable operations (e.g., corresponding to libraries) and a listing of compliant operations.

A cryptographic operation may include the use of different cryptographic implementations (e.g., different software used to implement the cryptographic functionality) and different configurations of cryptographic implementations. For a compliant cryptographic operation, a number of processes may occur within a cryptographic implementation that may not be performed when operating in a mode that is non-compliant with the cryptographic operation validation policy. For example, when using a hashing function or algorithm, a FIPS 140-compliant procedure may require a first number of iterations, while a non-FIPS 140-compliant procedure may not be required to perform the first number of iterations. That is, a non-compliant version of the hashing function may perform fewer iterations. Other examples of cryptography that is non-complaint may include implementations that do not require cryptographic self-tests of a component before use, implementations that do not establish minimum requirements for entropy, or implementations that may not disallow methods that have been deprecated or are not deemed secure.

In some examples, the virtual machine 220 may execute the cryptographic operation logic 225, and the virtual machine 220 may return a result of executing the cryptographic operation logic 225 back to the application 215. As such, the described techniques may support modifying an underlying implementation of the virtual machine 220 to ensure that a requested cryptographic operation is directed to the particular set of designated cryptographic operations, when a tenant, application, etc. is configured as such. As compliant algorithms and procedures (e.g., operations) may be periodically change, the designated set of cryptographic operations (e.g., managed by the cryptographic operation logic 225) may be replaced with an updated set of cryptographic operations (e.g., newer versions), an alternate designated set of cryptographic operations from an external vendor (e.g., a third party), or any combination thereof, without modifying one or more code sets associated with the application 215 running on the virtual machine 220. Thus, compliance may be efficiently maintained without modification of the application source code.

In some cases, a tenant may enable or disable the compliant behavior using a single run-time configuration setting at the virtual machine 220. For example, the tenant may initialize and use the compliant cryptographic operation logic 225 regardless of who developed the corresponding code (e.g., in-house or by a third party) or how the cryptographic operation is called at the virtual machine 220. In addition, a tenant may ensure that when requested, the compliant behavior is enabled regardless of how underlying security policy configuration files (e.g., Java security configuration files) associated with the application 215 are implemented.

In some examples, the virtual machine 220 may receive a request to perform a cryptographic operation that is not compliant or does not correspond to a compliant operation. For example, the application 215 may request a deprecated (e.g., in terms of a FIPS 140 policy) key generation algorithm. Based on receiving this cryptographic operation request, the virtual machine 220 (e.g., cryptographic operation logic 225) may determine that the tenant is subject to the cryptographic operation validation policy. Since, the request may be non-compliant with the cryptographic operation validation policy, the virtual machine 220 may return an error, and the error may indicate that the requested second cryptographic operation fails to satisfy the cryptographic operation validation policy. Thus, the virtual machine 220 and may refrain from executing the non-compliant cryptographic operation.

In some examples, a tenant may operate in a secure cloud environment (e.g., a government cloud environment) in which cryptographic operations may always be in compliance with the cryptographic operation validation policy. For example, commercial customers in particular industries (e.g., healthcare, financial services, or other highly-regulated markets) may align with federal requirements to always enable compliance with the cryptographic operation validation policy. In such cases, the virtual machine 220 may operate according to a virtual machine configuration specifying that the virtual machine 220 is configured to execute only cryptographic operations that are validated in accordance with the cryptographic operation validation policy. As such, the tenant may be limited to using the designated set of cryptographic operations based on the virtual machine configuration. In this approach, the cryptographic operation logic 225 may ensure that each cryptographic operation executed by the virtual machine 220 is compliant.

Additionally or alternatively, compliance with the cryptographic operation validation policy may be implemented on a per-tenant or application basis such that tenants may enable or disable compliant behavior based on a particular cryptographic operation, a particular operation, or other factors. That is, different tenants (e.g., commercial clients, government clients) may use the same virtual machine 220 for multiple use cases which may have enabled or disabled compliance with the cryptographic operation validation policy. For example, if a tenant experiences integration issues, transitions to an alternate designated set of cryptographic operations, updated the designated set of cryptographic operations, or any combination thereof, the tenant may turn off the compliant behavior until the issue is resolved or the transition or update is completed. To support tenant or application specific behavior, the application or application provider may be configured to set a thread local variable associated with an operation as described in further detail with respect to FIG. 3. The virtual machine 220 (e.g., the cryptographic operation logic 225) may be configured to query the thread local variable to determine that the request and tenant has a client preference, and execute any cryptographic operations accordingly. It should be noted that using a thread local variable is one example implementation of conditional compliance, and that other techniques for enabling/disabling compliance on a per tenant basis are contemplated within the scope of the present disclosure.

In some examples, the virtual machine 220 and an associated coding language (e.g., Java) may provide particular methods (e.g., including classes, libraries, algorithms, and the like) for cryptography. For example, a security provider (e.g., a cryptographic provider) may specify a set of certified libraries that the tenant may use and maintain compliance with the cryptographic operation validation policy. If a tenant is in a compliance mode (e.g., if the tenant is enabled to be compliant with the cryptographic operation validation policy), then the tenant may be forced to use a security provider associated with the cryptographic operation validation policy irrespective of what security provider the application may specify (e.g., including associated libraries, algorithms, and the like). Put another way, even if a tenant (e.g., application 215) specifies to run an operation using a particular security provider, the virtual machine 220 may override the tenant's specification and force the tenant to use the security provider associated with the cryptographic operation validation policy (e.g., BCFIPS). In some examples, the fact that the tenant-specified provider was overridden may be logged or otherwise communicated to the tenant to support compliance assessments and troubleshooting. As such, the virtual machine 220 may execute an operation supported by a compliant security provider and associated validated software packages and return a result of such execution to the application 215.

In some examples, once the virtual machine 220 determines that the tenant is limited to using the designated set of cryptographic operations (e.g., that the tenant is enabled to operate in a compliance mode), then the virtual machine 220 may reference a cryptographic provider (e.g., a security provider) to execute the requested cryptographic operation for the application 215. To execute the cryptographic operation logic 225, the virtual machine 220 may call a provider class (e.g., java.security.provider) which may identify a number of cryptographic services that are provided by the cryptographic provider that the virtual machine 220 may use to execute the cryptographic operation logic 225. Once the cryptographic provider is identified (e.g., BCFIPS), the virtual machine 220 may use cryptographic algorithms supported by that cryptographic provider (e.g., cipher, keyFactory, other key generators), which have been validated in accordance with the cryptographic operation validation policy. In addition, by enabling compliance with the cryptographic operation validation policy through a provider at the virtual machine level (e.g., a security provider for a compliant mode, a non-secure provider for a non-compliant mode), software developers may not be limited to writing code in a particular way.

Additionally or alternatively, if there is an issue with a security provider and corresponding software packages (e.g., a bug in BCFIPS), then the virtual machine 220 may change to a different security provider that is compliant with the cryptographic operation validation policy without altering the customer-developed code. That is, enabling or disabling compliant behavior, changing security providers, and other processes at the virtual machine 220 may occur without changing case-specific code (e.g., the code for the application 215). Thus, the cryptographic operation logic 225 may be updated to enable or disable compliant behavior, change security providers, or other processes for the virtual machine 220.

Example cryptographic operations may include various algorithms such as algorithms supporting, signatures, message authentication codes, encryption, decryption, key generation, hashing, secure handshakes, key agreement, etc. In some examples, there may be multiple implementations, configurations, etc. of each type of algorithm. For example, there may be one or more FIPS 140-compliant key generation algorithms and one or more FIPS 140-noncompliant key generation algorithms. Further, various compliant and/or not compliant algorithms may be supported or provided by different providers. Thus, if the application requests an algorithm supported by a non-compliant provider, the cryptographic operation logic 225 may be configured to identify the corresponding algorithm supported by a compliant provider. Similarly, if the application 215 requests an operation/algorithm with a non-compliant configuration, the cryptographic operation logic 225 may be configured to identify a compliant configuration and execute the requested operation in a compliant manner. Thus, the logic 225 may maintain or be configured with mappings of non-compliant to compliant algorithms, non-compliant to compliant providers, compliant configurations, etc. Thus, because these mappings and configurations are maintained at the virtual machine 220 layer, and because the virtual machine may support a number of tenants and application, the virtual machine (e.g., cryptographic operation logic 225) may be updated to support a changed compliancy standard, without having to change the application code.

Figure 3:
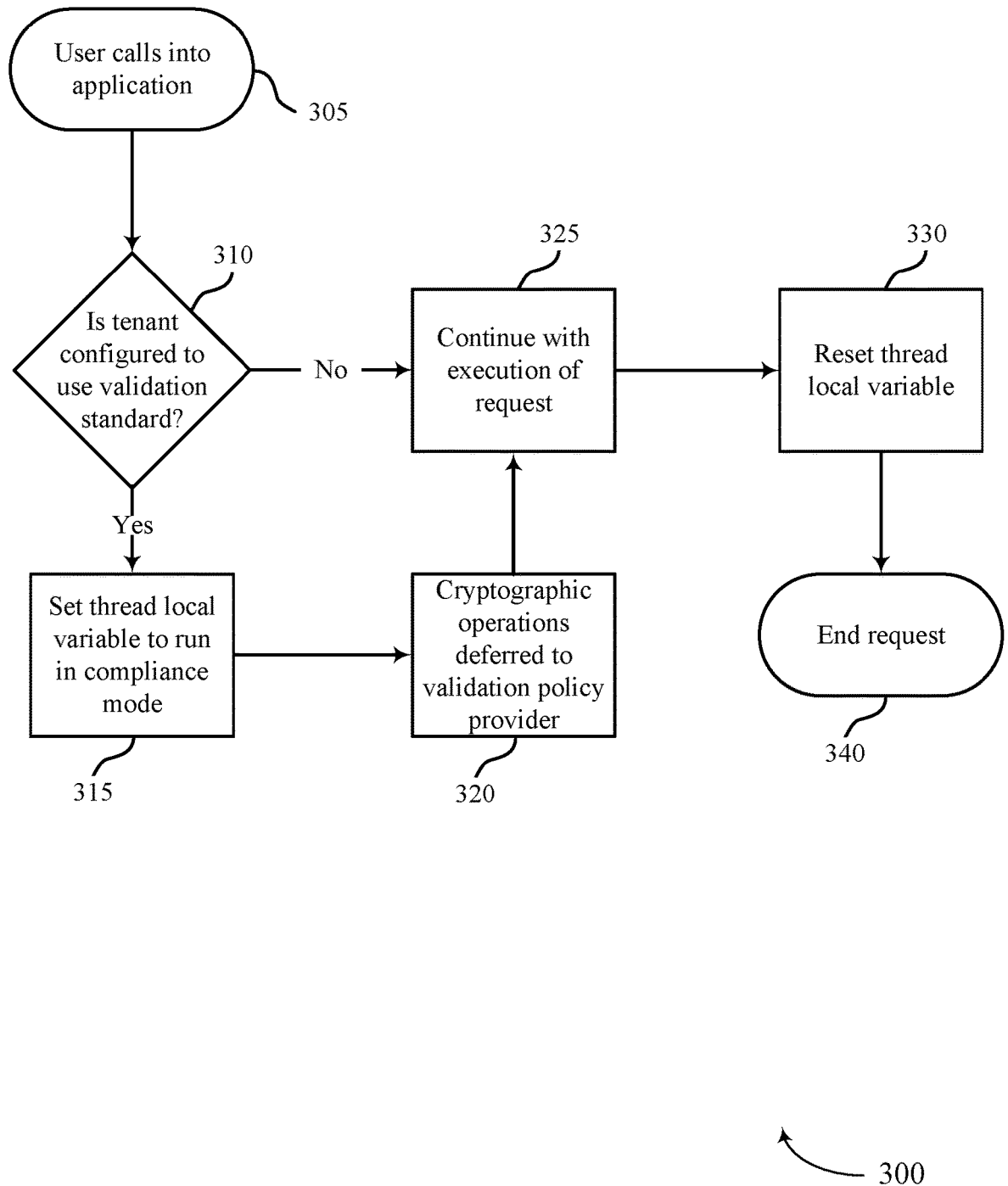
FIG. 3 illustrates an example of a process flow that supports tenant-aware cryptography implementations in multi-tenant applications in accordance with aspects of the present disclosure.

FIG. 3 illustrates an example of a process flow 300 that supports tenant-aware cryptography implementations in multi-tenant applications in accordance with aspects of the present disclosure. The process flow 300 may be implemented by the application server 210 described herein with reference to FIG. 2, and may support validating the compliance of different cryptographic operations with a cryptographic operation validation policy. The operations in the process flow 300 may be performed to enable compliance with a cryptographic operation validation policy on a per-tenant basis.

In some examples, to enable compliance with the cryptographic operation validation policy on a tenant-by-tenant basis, a virtual machine (e.g., a JVM) may be modified to enable compliant behavior using thread local variables. At 305, a user may call into an application via a user device. At 310, the application (e.g., cloud platform 115 of FIG. 1) may determine if the tenant is configured to use the cryptographic operation validation policy (e.g., validation standard, such as FIPS 140). That is, for each application call, the application may be configured to set a thread local variable to indicate a compliance preference. At 315, if the application determines that the tenant as a compliance preference, the application may set a thread local variable to indicate that any cryptographic operation is to be executed according to a compliant mode. Thus, at 320, when the virtual machine determines a cryptographic operation request, the virtual machine may query the thread local variable to determine the compliance preference (e.g., including the indication of a particular provider, when applicable). Thus, the virtual machine may defer the cryptographic operations to the compliant cryptographic provider. For example, the cryptographic operation may be executed using a security provider (e.g., BCFIPS) which may use software packages that are compliant with the cryptographic operation validation policy. Based on querying the thread local variable, the virtual machine may determine that the tenant is limited to using a designated set of cryptographic operations associated with the cryptographic provider in accordance with a cryptographic operation validation policy associated with the tenant.

In some examples, the user may call into the application, and the application provider may determine that the tenant is not configured to use the validation standard. In such cases, the application may set a thread local variable to indicate the non-validation preference. Upon receiving a cryptographic operation request by the application, the virtual machine may query the thread local variable and determine that the second tenant is not subject to the cryptographic operation policy. At 325, based on the determination, the virtual machine may continue with execution of the request. That is, the virtual machine may execute the second cryptographic operation at the virtual machine based on determining that the second tenant is not subject to the cryptographic operation validation policy.

The cryptographic provider may be used to support the cryptographic operation until the cryptographic operation is completed. At 330, once the request is completed, the application may release a thread associated with the application call (and execution of the corresponding cryptographic operation), which may release the thread local variable. At 340, the application may signal the end of the request (e.g., by returning a result of the user call into the application). The process flow 300 may restart with a new call into the application. Thus, operations at 310 and 315 may be performed on the application side, while operations at 320 and 325 may be performed at the virtual machine supporting the application.

In some examples, the per-tenant preference to set the thread local variable to run in a compliance mode may be cached using various methods to mitigate performance costs associated with repeatedly looking up the preference. For example, the preference may be to disable the compliance mode for application-specific use cases in which non-compliant cryptography may be used for non-security use cases. As such, compliance with the cryptographic operation validation policy may be used in accordance with provided requirements, while the application may maintain the flexibility to support a broad set of use cases that support compliance or non-compliance with the cryptographic operation validation policy.

Thus, using thread local variables may support enabling and disabling compliance with the cryptographic operation validation policy on a tenant-by-tenant basis. For example, if a tenant is enabled to operate in a compliance mode, then the application may set a thread local variable to run in the compliance mode for the tenant. If the tenant is enabled to operate in a non-compliance mode, the application may use a regular provider and implementation to execute a request (e.g., without using a compliant security provider). That is, the application may dynamically change out providers for different tenants (e.g., BCFIPS for a compliant cryptographic operation, a non-secure provider for a non-compliant cryptographic operation). While multiple tenants may execute on the same virtual machine, using a thread local variable may enable or disable compliance for the multiple tenants depending on their particular environments.

In some cases, the thread local variable may be used to trigger activation of other types of cryptographic operations. That is, tenants may request the use of cryptographic implementations through thread local variable definitions, which may enable tenants to evaluate new versions of cryptographic implementations or take advantage of implementations that offer different features (e.g., new, experimental features) without impacting the application or other tenants. Thus, if such a preference is enabled, at 315, the thread local variable may be set to a value that indicates that the virtual machine is to use the new versions of implementations or the implementations with different features. Thus, these features and implementations may be activated without modifying the application code. It should be noted that using a thread local variable is one example implementation of conditional compliance, and that other techniques for enabling/disabling compliance on a per tenant basis are contemplated within the scope of the present disclosure.

Figure 4:
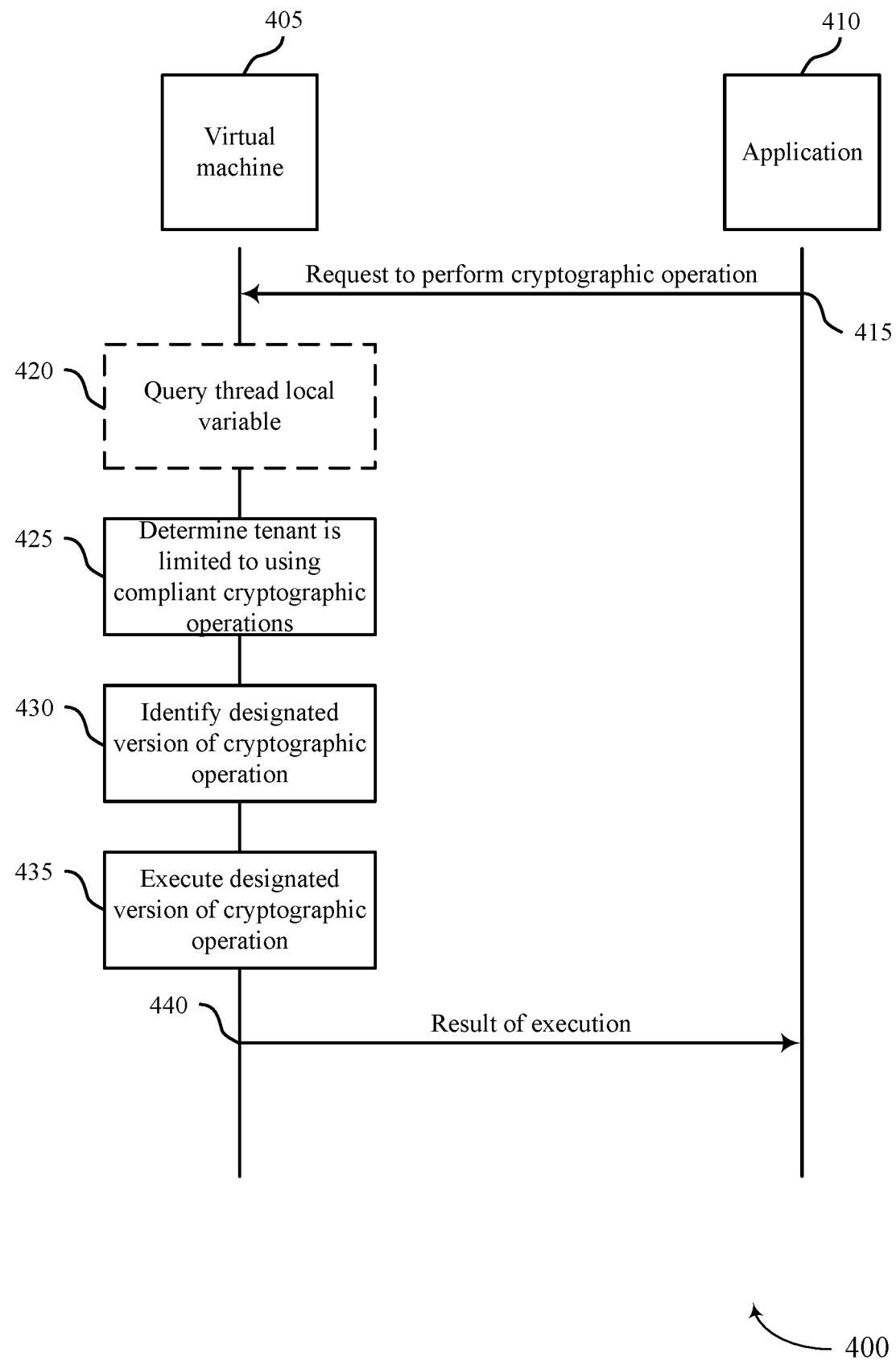
FIG. 4 illustrates an example of a process flow that supports tenant-aware cryptography implementations in multi-tenant applications in accordance with aspects of the present disclosure.

FIG. 4 illustrates an example of a process flow 400 that supports tenant-aware cryptography implementations in multi-tenant applications in accordance with aspects of the present disclosure. The process flow 400 may implement aspects of the system 100 and the computing architecture 200, or may be implemented by aspects of the system 100 and the computing architecture 200. The process flow 400 may include a virtual machine 405 (e.g., a JVM) and an application 410. In the following description of the process flow 400, the operations between the virtual machine 405 and the application 410 may be performed in different orders or at different times. Some operations may also be left out of the process flow 400, or other operations may be added. Although the virtual machine 405 and the application 410 are shown performing the operations of the process flow 400, some aspects of some operations may also be performed by one or more other devices, or may be performed by other devices included in the process flow.

At 415, the virtual machine 405 may receive, from the application 410 associated with a tenant, a request to perform a cryptographic operation for the application at the virtual machine 405. For example, the tenant may be associated with an organization (e.g., a government organization) that may secure data and information using cryptographic means.

At 420, the virtual machine 405 may query a thread local variable based on receiving the request, where the thread local variable may include a reference to a cryptographic provider (e.g., BCFIPS) or a preference for a compliance mode.

At 425, the virtual machine 405 may determine, based on receiving the request, that the tenant is limited to using a designated set of cryptographic operations in accordance with a cryptographic operation validation policy associated with the tenant (e.g., FIPS 140), where the designated set of cryptographic operations are validated in accordance with the cryptographic operation validation policy. In some examples, the virtual machine may determine that the tenant is limited to using the designated set of cryptographic operations based on querying the thread local variable as the thread local variable is set to run in the compliance mode. In other cases, the virtual machine 405 may be configured to ensure that some or all cryptographic operations are executed in a compliant manner. In such cases, the virtual machine may not query the thread local variable, but may execute the compliant operations (or return errors).

At 430, the virtual machine 405 may identify a designated version of the cryptographic operation, from the set of cryptographic operations, that corresponds to the cryptographic operation indicated in the request in satisfaction of the cryptographic operation validation policy associated with the tenant. That is, the designated version of the cryptographic operation may comply with the cryptographic operation validation policy, ensuring that the cryptographic operation is properly implemented.

At 435, the virtual machine 405 may execute the designated version of the cryptographic operation at the virtual machine 405. In some examples, the cryptographic provider associated with the thread local variable may provide instructions that are executed by the virtual machine to perform the cryptographic operation.

At 440, the virtual machine 405 may return, to the application 410, a result of executing the designated version of the cryptographic operation. In some examples, in response to returning the result, the virtual machine 405 may release a thread associated with the execution of the designated version of the cryptographic operation and release the thread local variable.

Figure 5:
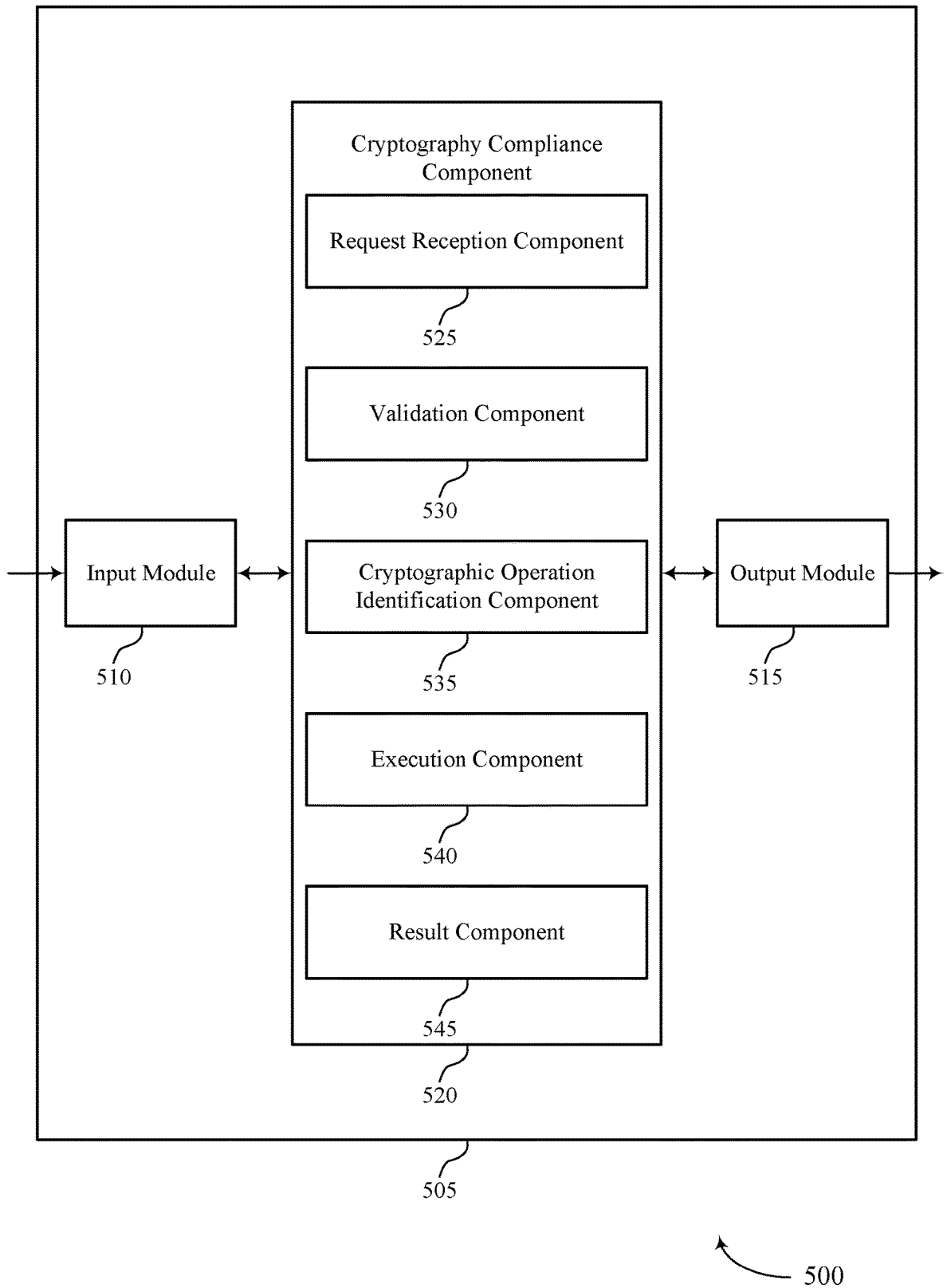
FIG. 5 shows a block diagram of an apparatus that supports tenant-aware cryptography implementations in multi-tenant applications in accordance with aspects of the present disclosure.

FIG. 5 shows a block diagram 500 of a device 505 that supports tenant-aware cryptography implementations in multi-tenant applications in accordance with aspects of the present disclosure. The device 505 may include an input module 510, an output module 515, and a cryptography compliance component 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the cryptography compliance component 520 to support tenant-aware cryptography implementations in multi-tenant applications. In some cases, the input module 510 may be a component of an I/O controller 710 as described with reference to FIG. 7.

The output module 515 may manage output signals for the device 505. For example, the output module 515 may receive signals from other components of the device 505, such as the cryptography compliance component 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the cryptography compliance component 520 may include a request reception component 525, a validation component 530, a cryptographic operation identification component 535, an execution component 540, a result component 545, or any combination thereof. In some examples, the cryptography compliance component 520, or various components thereof, may be configured to perform various operations (e.g., receiving, monitoring, transmitting) using or otherwise in cooperation with the input module 510, the output module 515, or both. For example, the cryptography compliance component 520 may receive information from the input module 510, send information to the output module 515, or be integrated in combination with the input module 510, the output module 515, or both to receive information, transmit information, or perform various other operations as described herein.

The cryptography compliance component 520 may support data processing in accordance with examples as disclosed herein. In some cases, the cryptographic compliance component may be configured with the cryptographic operation logic 225 as described with respect to FIG. 2. The cryptography compliance component may be implemented by a virtual machine. The request reception component 525 may be configured as or otherwise support a means for receiving, from an application associated with a tenant and at a virtual machine, a request to perform a cryptographic operation for the application at the virtual machine. The validation component 530 may be configured as or otherwise support a means for determining, based at least in part on receiving the request, that the tenant is limited to using a designated set of cryptographic operations in accordance with a cryptographic operation validation policy associated with the tenant, and wherein the designated set of cryptographic operations are validated in accordance with the cryptographic operation validation policy. The cryptographic operation identification component 535 may be configured as or otherwise support a means for identifying a designated version of the cryptographic operation, from the designated set of cryptographic operations, that corresponds to the cryptographic operation indicated by the request in satisfaction of the cryptographic operation validation policy associated with the tenant. The execution component 540 may be configured as or otherwise support a means for executing the designated version of the cryptographic operation at the virtual machine. The result component 545 may be configured as or otherwise support a means for returning, to the application, a result of executing the designated version of the cryptographic operation.

Figure 6:
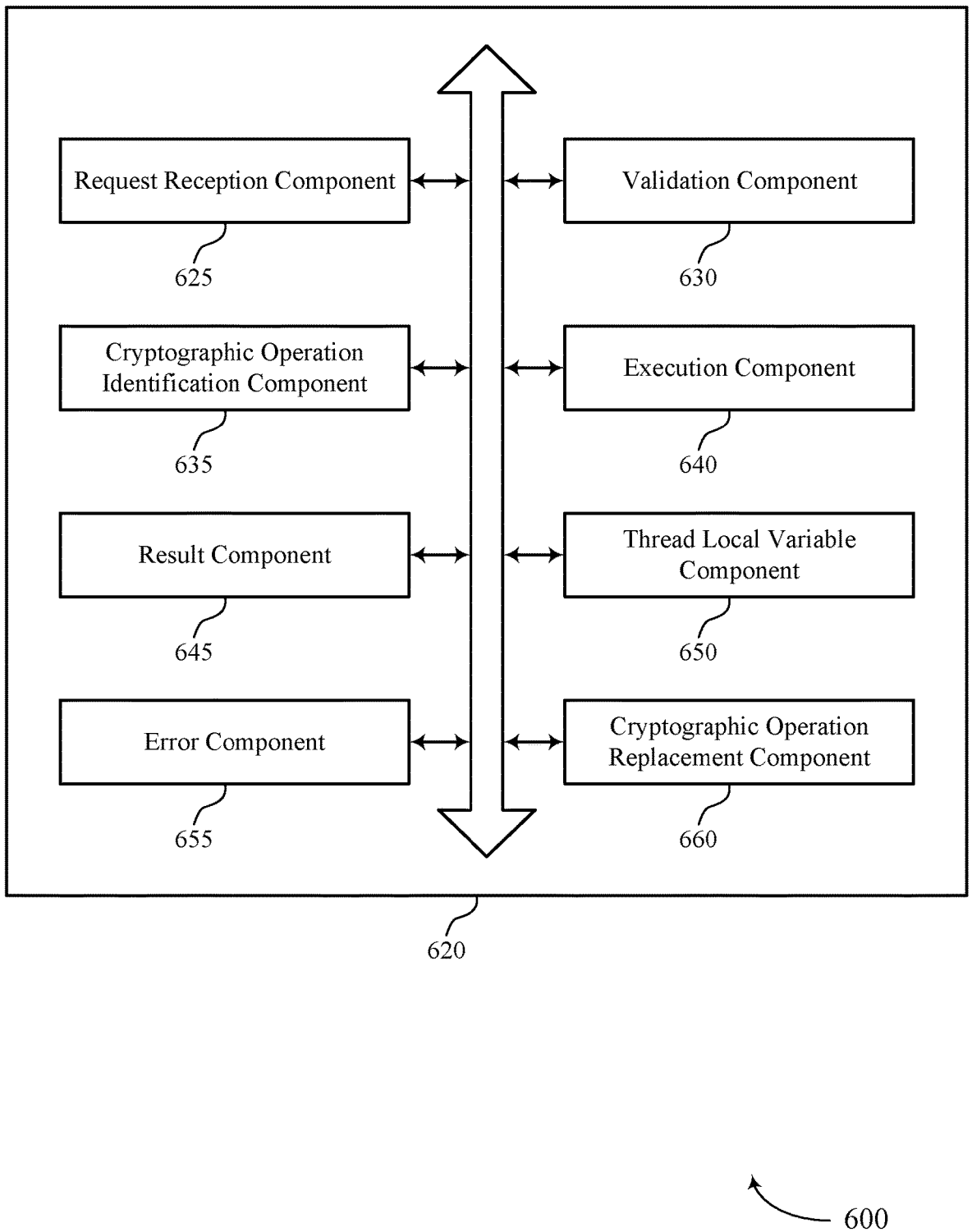
FIG. 6 shows a block diagram of a cryptography compliance component that supports tenant-aware cryptography implementations in multi-tenant applications in accordance with aspects of the present disclosure.

FIG. 6 shows a block diagram 600 of a cryptography compliance component 620 that supports tenant-aware cryptography implementations in multi-tenant applications in accordance with aspects of the present disclosure. The cryptography compliance component 620 may be an example of aspects of a cryptography compliance component or a cryptography compliance component 520, or both, as described herein. The cryptography compliance component 620, or various components thereof, may be an example of means for performing various aspects of tenant-aware cryptography implementations in multi-tenant applications as described herein. For example, the cryptography compliance component 620 may include a request reception component 625, a validation component 630, a cryptographic operation identification component 635, an execution component 640, a result component 645, a thread local variable component 650, an error component 655, a cryptographic operation replacement component 660, or any combination thereof. Each of these components may communicate, directly or indirectly, with one another (e.g., via one or more buses).

The cryptography compliance component 620 may support data processing in accordance with examples as disclosed herein. The request reception component 625 may be configured as or otherwise support a means for receiving, from an application associated with a tenant and at a virtual machine, a request to perform a cryptographic operation for the application at the virtual machine. The validation component 630 may be configured as or otherwise support a means for determining, based at least in part on receiving the request, that the tenant is limited to using a designated set of cryptographic operations in accordance with a cryptographic operation validation policy associated with the tenant, and wherein the designated set of cryptographic operations are validated in accordance with the cryptographic operation validation policy. The cryptographic operation identification component 635 may be configured as or otherwise support a means for identifying a designated version of the cryptographic operation, from the designated set of cryptographic operations, that corresponds to the cryptographic operation indicated by the request in satisfaction of the cryptographic operation validation policy associated with the tenant. The execution component 640 may be configured as or otherwise support a means for executing the designated version of the cryptographic operation at the virtual machine. The result component 645 may be configured as or otherwise support a means for returning, to the application, a result of executing the designated version of the cryptographic operation.

In some examples, the thread local variable component 650 may be configured as or otherwise support a means for querying a thread local variable based at least in part on receiving the request, wherein the thread local variable comprises a reference to a cryptographic provider. In some examples, the validation component 630 may be configured as or otherwise support a means for determining, based at least in part on querying the thread local variable, that the tenant is limited to using the designated set of cryptographic operations associated with the cryptographic provider in accordance with the cryptographic operation validation policy associated with the tenant.

In some examples, the thread local variable component 650 may be configured as or otherwise support a means for releasing a thread associated with the execution of the designated version of the cryptographic operation in response to returning the result, wherein releasing of the thread includes releasing the thread local variable.

In some examples, the request reception component 625 may be configured as or otherwise support a means for receiving, from the application, a second request to perform a second cryptographic operation. In some examples, the validation component 630 may be configured as or otherwise support a means for determining, based at least in part on receiving the second request, that the tenant is limited to using the designated set of cryptographic operations. In some examples, the error component 655 may be configured as or otherwise support a means for determining that the second cryptographic operation is an invalid request according to the cryptographic operation validation policy. In some examples, the error component 655 may be configured as or otherwise support a means for returning an error indicating that the requested second cryptographic operation fails to satisfy the cryptographic operation validation policy associated with the tenant.

In some examples, the cryptographic operation replacement component 660 may be configured as or otherwise support a means for replacing the designated set of cryptographic operations with an updated designated set of cryptographic operations, an alternate designated set of cryptographic operations from a vendor, or any combination thereof. In some examples, the designated set of cryptographic operations is replaced at the virtual machine without modifying one or more code sets associated with the application.

In some examples, the request reception component 625 may be configured as or otherwise support a means for receiving, from an application associated with a second tenant, a second request to perform a second cryptographic operation. In some examples, the validation component 630 may be configured as or otherwise support a means for determining, based at least in part on receiving the second request, that the second tenant is not subject to the cryptographic operation validation policy. In some examples, the execution component 640 may be configured as or otherwise support a means for executing the second cryptographic operation at the virtual machine based at least in part on determining that the second tenant is not subject to the cryptographic operation validation policy.

In some examples, the virtual machine operates according to a virtual machine configuration specifying that the virtual machine is configured to execute only cryptographic operations that are validated in accordance with the cryptographic operation validation policy, wherein the tenant is limited to using the designated set of cryptographic operations based at least in part on the virtual machine configuration.

In some examples, the virtual machine is a JVM. In some examples, the cryptographic operation validation policy comprises a FIPS Publication 140.

Figure 7:
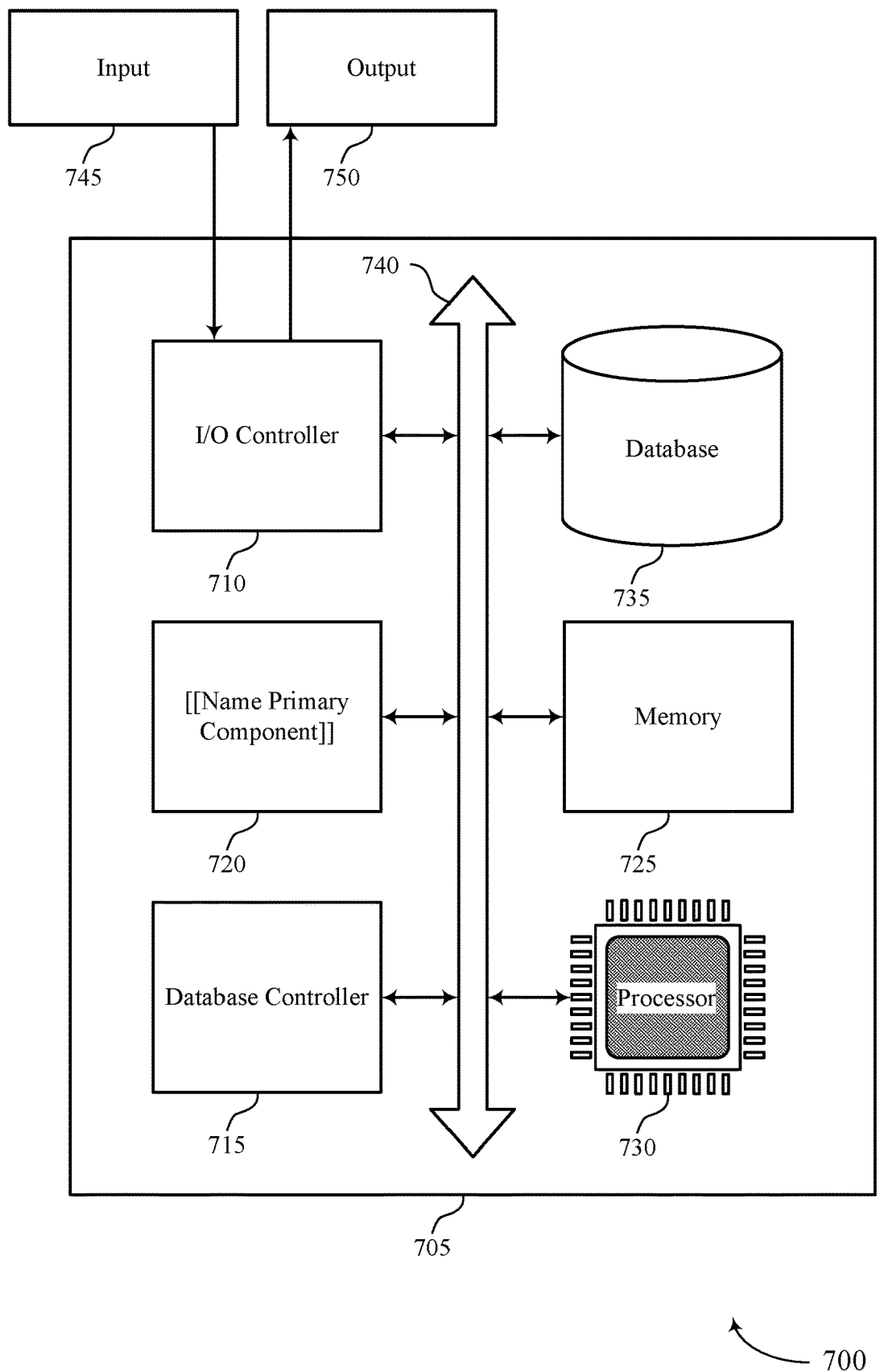
FIG. 7 shows a diagram of a system including a device that supports tenant-aware cryptography implementations in multi-tenant applications in accordance with aspects of the present disclosure.

FIG. 7 shows a diagram of a system 700 including a device 705 that supports tenant-aware cryptography implementations in multi-tenant applications in accordance with aspects of the present disclosure. The device 705 may be an example of or include the components of a device 505 as described herein. The device 705 may include components for bi-directional data communications including components for transmitting and receiving communications, such as a cryptography compliance component 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor 730 to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting tenant-aware cryptography implementations in multi-tenant applications).

The cryptography compliance component 720 may support data processing in accordance with examples as disclosed herein. For example, the cryptography compliance component 720 may be configured as or otherwise support a means for receiving, from an application associated with a tenant and at a virtual machine, a request to perform a cryptographic operation for the application at the virtual machine. The cryptography compliance component 720 may be configured as or otherwise support a means for determining, based at least in part on receiving the request, that the tenant is limited to using a designated set of cryptographic operations in accordance with a cryptographic operation validation policy associated with the tenant, and wherein the designated set of cryptographic operations are validated in accordance with the cryptographic operation validation policy. The cryptography compliance component 720 may be configured as or otherwise support a means for identifying a designated version of the cryptographic operation, from the designated set of cryptographic operations, that corresponds to the cryptographic operation indicated by the request in satisfaction of the cryptographic operation validation policy associated with the tenant. The cryptography compliance component 720 may be configured as or otherwise support a means for executing the designated version of the cryptographic operation at the virtual machine. The cryptography compliance component 720 may be configured as or otherwise support a means for returning, to the application, a result of executing the designated version of the cryptographic operation.

By including or configuring the cryptography compliance component 720 in accordance with examples as described herein, the device 705 may support techniques for multi-tenant cryptographic implementation compliance, which may improve workflow efficiencies, increase a tenant's ability to comply with a cryptographic operation validation policy in particular situations, and increase security compliance for some vendors by enabling or disabling compliant behavior on a tenant-by-tenant basis at a virtual machine level.

Figure 8:
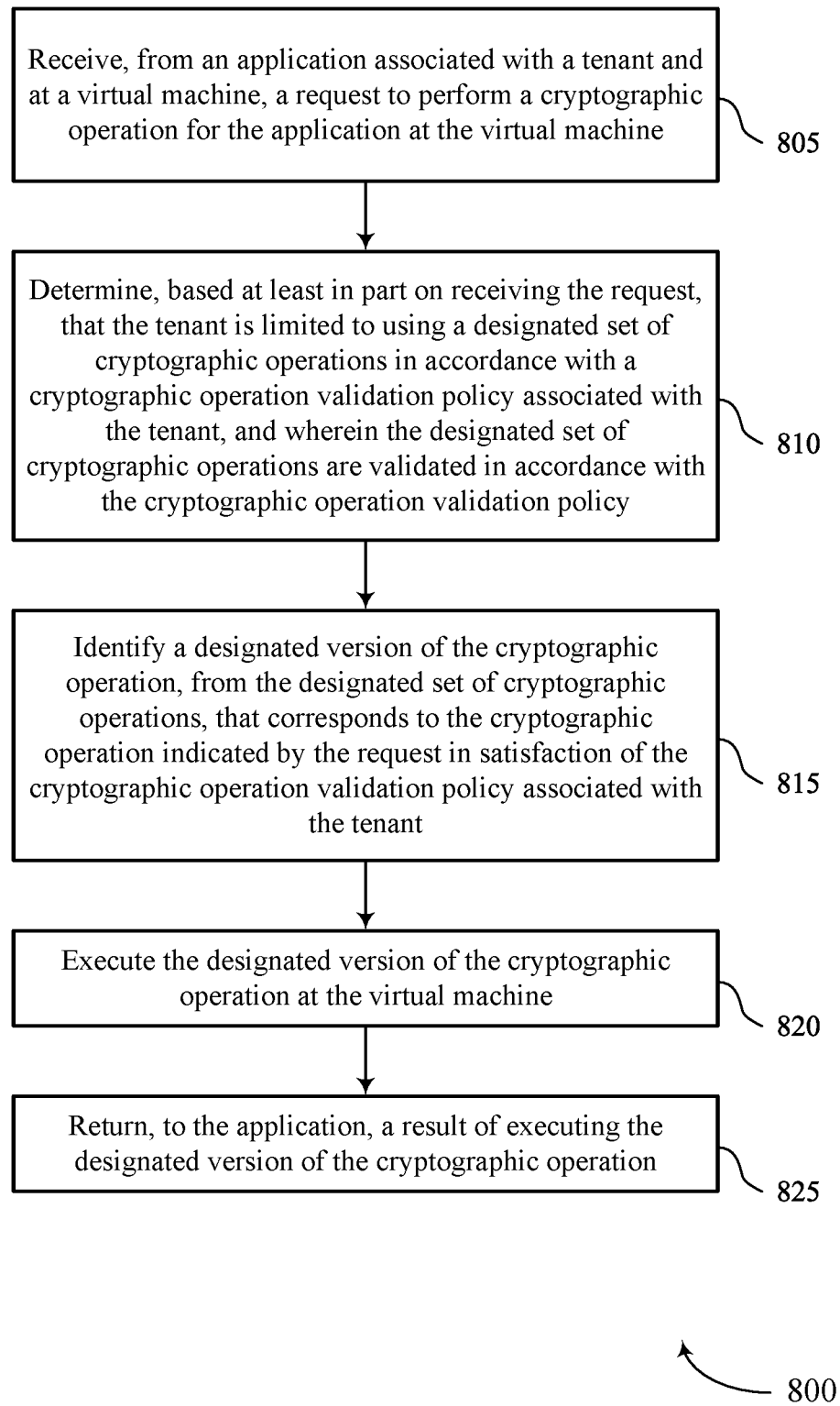
FIGS. 8 through 11 show flowcharts illustrating methods that support tenant-aware cryptography implementations in multi-tenant applications in accordance with aspects of the present disclosure.

FIG. 8 shows a flowchart illustrating a method 800 that supports tenant-aware cryptography implementations in multi-tenant applications in accordance with aspects of the present disclosure. The operations of the method 800 may be implemented by a server or its components as described herein. For example, the operations of the method 800 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 805, the method may include receiving, from an application associated with a tenant and at a virtual machine, a request to perform a cryptographic operation for the application at the virtual machine. The operations of 805 may be performed in accordance with examples as disclosed herein. In some examples, aspects of the operations of 805 may be performed by a request reception component 625 as described with reference to FIG. 6.

At 810, the method may include determining, based at least in part on receiving the request, that the tenant is limited to using a designated set of cryptographic operations in accordance with a cryptographic operation validation policy associated with the tenant, and wherein the designated set of cryptographic operations are validated in accordance with the cryptographic operation validation policy. The operations of 810 may be performed in accordance with examples as disclosed herein. In some examples, aspects of the operations of 810 may be performed by a validation component 630 as described with reference to FIG. 6.

At 815, the method may include identifying a designated version of the cryptographic operation, from the designated set of cryptographic operations, that corresponds to the cryptographic operation indicated by the request in satisfaction of the cryptographic operation validation policy associated with the tenant. The operations of 815 may be performed in accordance with examples as disclosed herein. In some examples, aspects of the operations of 815 may be performed by a cryptographic operation identification component 635 as described with reference to FIG. 6.

At 820, the method may include executing the designated version of the cryptographic operation at the virtual machine. The operations of 820 may be performed in accordance with examples as disclosed herein. In some examples, aspects of the operations of 820 may be performed by an execution component 640 as described with reference to FIG. 6.

At 825, the method may include returning, to the application, a result of executing the designated version of the cryptographic operation. The operations of 825 may be performed in accordance with examples as disclosed herein. In some examples, aspects of the operations of 825 may be performed by a result component 645 as described with reference to FIG. 6.

Figure 9:
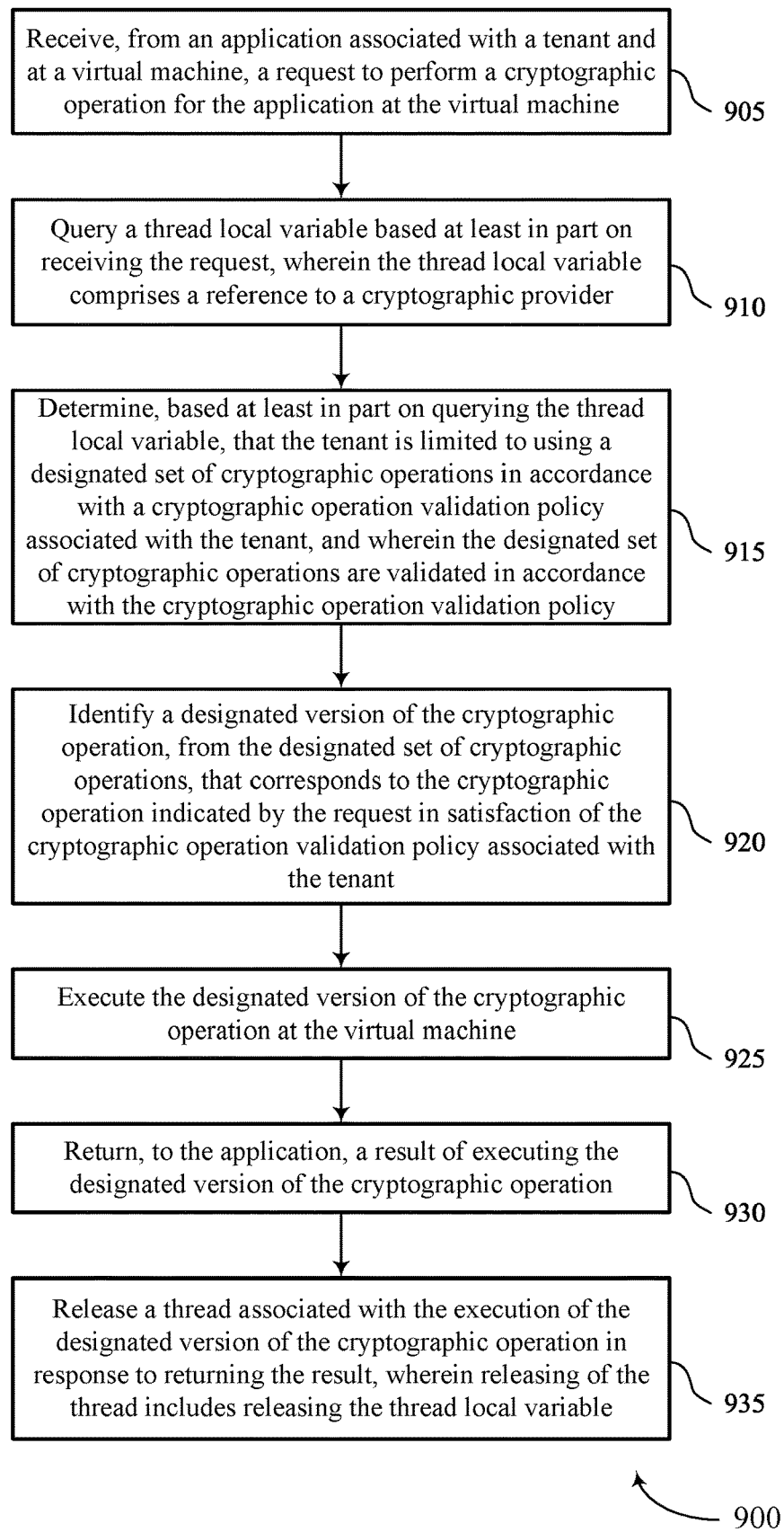

FIG. 9 shows a flowchart illustrating a method 900 that supports tenant-aware cryptography implementations in multi-tenant applications in accordance with aspects of the present disclosure. The operations of the method 900 may be implemented by a server or its components as described herein. For example, the operations of the method 900 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 905, the method may include receiving, from an application associated with a tenant and at a virtual machine, a request to perform a cryptographic operation for the application at the virtual machine. The operations of 905 may be performed in accordance with examples as disclosed herein. In some examples, aspects of the operations of 905 may be performed by a request reception component 625 as described with reference to FIG. 6.

At 910, the method may include querying a thread local variable based at least in part on receiving the request, wherein the thread local variable comprises a reference to a cryptographic provider. The operations of 910 may be performed in accordance with examples as disclosed herein. In some examples, aspects of the operations of 910 may be performed by a thread local variable component 650 as described with reference to FIG. 6.

At 915, the method may include determining, based at least in part on querying the thread local variable, that the tenant is limited to using a designated set of cryptographic operations in accordance with a cryptographic operation validation policy associated with the tenant, and wherein the designated set of cryptographic operations are validated in accordance with the cryptographic operation validation policy. The operations of 915 may be performed in accordance with examples as disclosed herein. In some examples, aspects of the operations of 915 may be performed by a validation component 630 as described with reference to FIG. 6.

At 920, the method may include identifying a designated version of the cryptographic operation, from the designated set of cryptographic operations, that corresponds to the cryptographic operation indicated by the request in satisfaction of the cryptographic operation validation policy associated with the tenant. The operations of 920 may be performed in accordance with examples as disclosed herein. In some examples, aspects of the operations of 920 may be performed by a cryptographic operation identification component 635 as described with reference to FIG. 6.

At 925, the method may include executing the designated version of the cryptographic operation at the virtual machine. The operations of 925 may be performed in accordance with examples as disclosed herein. In some examples, aspects of the operations of 925 may be performed by an execution component 640 as described with reference to FIG. 6.

At 930, the method may include returning, to the application, a result of executing the designated version of the cryptographic operation. The operations of 930 may be performed in accordance with examples as disclosed herein. In some examples, aspects of the operations of 930 may be performed by a result component 645 as described with reference to FIG. 6.

At 935, the method may include releasing a thread associated with the execution of the designated version of the cryptographic operation in response to returning the result, wherein releasing of the thread includes releasing the thread local variable. The operations of 935 may be performed in accordance with examples as disclosed herein. In some examples, aspects of the operations of 935 may be performed by a thread local variable component 650 as described with reference to FIG. 6.

Figure 10:
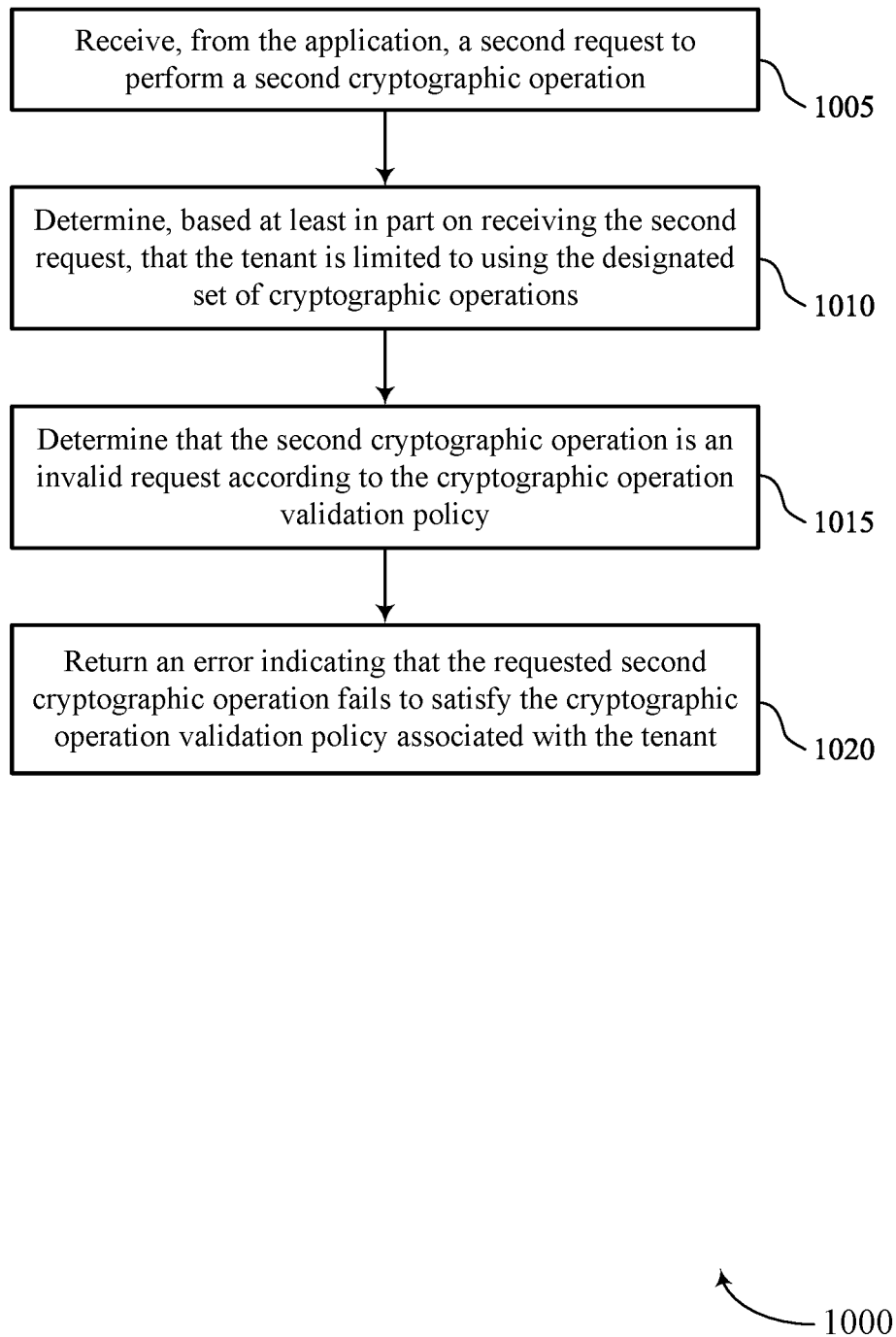

FIG. 10 shows a flowchart illustrating a method 1000 that supports tenant-aware cryptography implementations in multi-tenant applications in accordance with aspects of the present disclosure. The operations of the method 1000 may be implemented by a server or its components as described herein. For example, the operations of the method 1000 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 1005, the method may include receiving, from the application, a second request to perform a second cryptographic operation. The operations of 1005 may be performed in accordance with examples as disclosed herein. In some examples, aspects of the operations of 1005 may be performed by a request reception component 625 as described with reference to FIG. 6.

At 1010, the method may include determining, based at least in part on receiving the second request, that the tenant is limited to using the designated set of cryptographic operations. The operations of 1010 may be performed in accordance with examples as disclosed herein. In some examples, aspects of the operations of 1010 may be performed by a validation component 630 as described with reference to FIG. 6.

At 1015, the method may include determining that the second cryptographic operation is an invalid request according to the cryptographic operation validation policy. The operations of 1015 may be performed in accordance with examples as disclosed herein. In some examples, aspects of the operations of 1015 may be performed by an error component 655 as described with reference to FIG. 6.

At 1020, the method may include returning an error indicating that the requested second cryptographic operation fails to satisfy the cryptographic operation validation policy associated with the tenant. The operations of 1020 may be performed in accordance with examples as disclosed herein. In some examples, aspects of the operations of 1020 may be performed by an error component 655 as described with reference to FIG. 6.

Figure 11:
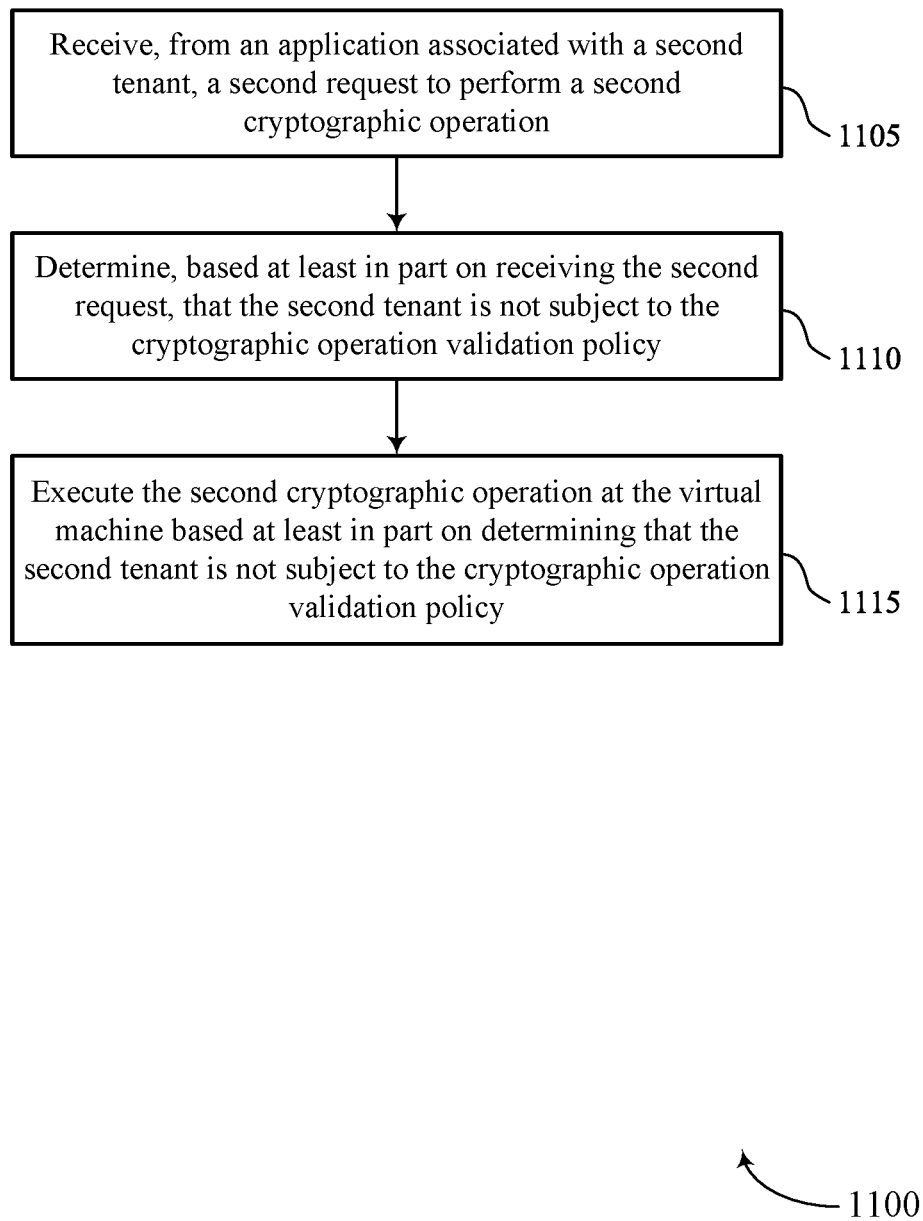

FIG. 11 shows a flowchart illustrating a method 1100 that supports tenant-aware cryptography implementations in multi-tenant applications in accordance with aspects of the present disclosure. The operations of the method 1100 may be implemented by a server or its components as described herein. For example, the operations of the method 1100 may be performed by a server as described with reference to FIGS. 1 through 7. In some examples, a server may execute a set of instructions to control the functional elements of the server to perform the described functions. Additionally or alternatively, the server may perform aspects of the described functions using special-purpose hardware.

At 1105, the method may include receiving, from an application associated with a second tenant, a second request to perform a second cryptographic operation. The operations of 1105 may be performed in accordance with examples as disclosed herein. In some examples, aspects of the operations of 1105 may be performed by a request reception component 625 as described with reference to FIG. 6.

At 1110, the method may include determining, based at least in part on receiving the second request, that the second tenant is not subject to the cryptographic operation validation policy. The operations of 1110 may be performed in accordance with examples as disclosed herein. In some examples, aspects of the operations of 1110 may be performed by a validation component 630 as described with reference to FIG. 6.

At 1115, the method may include executing the second cryptographic operation at the virtual machine based at least in part on determining that the second tenant is not subject to the cryptographic operation validation policy. The operations of 1115 may be performed in accordance with examples as disclosed herein. In some examples, aspects of the operations of 1115 may be performed by an execution component 640 as described with reference to FIG. 6.

A method for data processing is described. The method may include receiving, from an application associated with a tenant and at a virtual machine, a request to perform a cryptographic operation for the application at the virtual machine, determining, based at least in part on receiving the request, that the tenant is limited to using a designated set of cryptographic operations in accordance with a cryptographic operation validation policy associated with the tenant, and wherein the designated set of cryptographic operations are validated in accordance with the cryptographic operation validation policy, identifying a designated version of the cryptographic operation, from the designated set of cryptographic operations, that corresponds to the cryptographic operation indicated by the request in satisfaction of the cryptographic operation validation policy associated with the tenant, executing the designated version of the cryptographic operation at the virtual machine, and returning, to the application, a result of executing the designated version of the cryptographic operation.

An apparatus for data processing is described. The apparatus may include a processor, memory coupled with the processor, and instructions stored in the memory. The instructions may be executable by the processor to cause the apparatus to receive, from an application associated with a tenant and at a virtual machine, a request to perform a cryptographic operation for the application at the virtual machine, determine, based at least in part on receiving the request, that the tenant is limited to using a designated set of cryptographic operations in accordance with a cryptographic operation validation policy associated with the tenant, and wherein the designated set of cryptographic operations are validated in accordance with the cryptographic operation validation policy, identify a designated version of the cryptographic operation, from the designated set of cryptographic operations, that corresponds to the cryptographic operation indicated by the request in satisfaction of the cryptographic operation validation policy associated with the tenant, execute the designated version of the cryptographic operation at the virtual machine, and return, to the application, a result of executing the designated version of the cryptographic operation.

Another apparatus for data processing is described. The apparatus may include means for receiving, from an application associated with a tenant and at a virtual machine, a request to perform a cryptographic operation for the application at the virtual machine, means for determining, based at least in part on receiving the request, that the tenant is limited to using a designated set of cryptographic operations in accordance with a cryptographic operation validation policy associated with the tenant, and wherein the designated set of cryptographic operations are validated in accordance with the cryptographic operation validation policy, means for identifying a designated version of the cryptographic operation, from the designated set of cryptographic operations, that corresponds to the cryptographic operation indicated by the request in satisfaction of the cryptographic operation validation policy associated with the tenant, means for executing the designated version of the cryptographic operation at the virtual machine, and means for returning, to the application, a result of executing the designated version of the cryptographic operation.

A non-transitory computer-readable medium storing code for data processing is described. The code may include instructions executable by a processor to receive, from an application associated with a tenant and at a virtual machine, a request to perform a cryptographic operation for the application at the virtual machine, determine, based at least in part on receiving the request, that the tenant is limited to using a designated set of cryptographic operations in accordance with a cryptographic operation validation policy associated with the tenant, and wherein the designated set of cryptographic operations are validated in accordance with the cryptographic operation validation policy, identify a designated version of the cryptographic operation, from the designated set of cryptographic operations, that corresponds to the cryptographic operation indicated by the request in satisfaction of the cryptographic operation validation policy associated with the tenant, execute the designated version of the cryptographic operation at the virtual machine, and return, to the application, a result of executing the designated version of the cryptographic operation.

Some examples of the method, apparatuses, and non-transitory computer-readable medium described herein may further include operations, features, means, or instructions for querying a thread local variable based at least in part on receiving the request, wherein the thread local variable comprises a reference to a cryptographic provider and determining, based at least in part on querying the thread local variable, that the tenant may be limited to using the designated set of cryptographic operations associated with the cryptographic provider in accordance with the cryptographic operation validation policy associated with the tenant.

Some examples of the method, apparatuses, and non-transitory computer-readable medium described herein may further include operations, features, means, or instructions for releasing a thread associated with the execution of the designated version of the cryptographic operation in response to returning the result, wherein releasing of the thread includes releasing the thread local variable.

Some examples of the method, apparatuses, and non-transitory computer-readable medium described herein may further include operations, features, means, or instructions for receiving, from the application, a second request to perform a second cryptographic operation, determining, based at least in part on receiving the second request, that the tenant may be limited to using the designated set of cryptographic operations, determining that the second cryptographic operation may be an invalid request according to the cryptographic operation validation policy, and returning an error indicating that the requested second cryptographic operation fails to satisfy the cryptographic operation validation policy associated with the tenant.

Some examples of the method, apparatuses, and non-transitory computer-readable medium described herein may further include operations, features, means, or instructions for replacing the designated set of cryptographic operations with an updated designated set of cryptographic operations, an alternate designated set of cryptographic operations from a vendor, or any combination thereof.

In some examples of the method, apparatuses, and non-transitory computer-readable medium described herein, the designated set of cryptographic operations may be replaced at the virtual machine without modifying one or more code sets associated with the application.

Some examples of the method, apparatuses, and non-transitory computer-readable medium described herein may further include operations, features, means, or instructions for receiving, from an application associated with a second tenant, a second request to perform a second cryptographic operation, determining, based at least in part on receiving the second request, that the second tenant may be not subject to the cryptographic operation validation policy, and executing the second cryptographic operation at the virtual machine based at least in part on determining that the second tenant may be not subject to the cryptographic operation validation policy.

In some examples of the method, apparatuses, and non-transitory computer-readable medium described herein, the virtual machine operates according to a virtual machine configuration specifying that the virtual machine may be configured to execute only cryptographic operations that may be validated in accordance with the cryptographic operation validation policy, wherein the tenant may be limited to using the designated set of cryptographic operations based at least in part on the virtual machine configuration.

In some examples of the method, apparatuses, and non-transitory computer-readable medium described herein, the virtual machine may be a JVM.

In some examples of the method, apparatuses, and non-transitory computer-readable medium described herein, the cryptographic operation validation policy comprises a FIPS Publication 140.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
receiving, from an application associated with a tenant and at a virtual machine, a request to perform a version of a cryptographic operation for the application at the virtual machine;
determining, based at least in part on receiving the request, that the tenant is limited to using a designated set of cryptographic operations in accordance with a cryptographic operation validation policy associated with the tenant, and wherein the designated set of cryptographic operations are validated in accordance with the cryptographic operation validation policy;
identifying a designated version of the cryptographic operation, from the designated set of cryptographic operations, that corresponds to the cryptographic operation indicated by the request and is different than the version of the cryptographic operation indicated by the request, the designated version of the cryptographic operation in satisfaction of the cryptographic operation validation policy associated with the tenant;
executing the designated version of the cryptographic operation at the virtual machine; and
returning, to the application, a result of executing the designated version of the cryptographic operation.

2. The method of claim 1, further comprising:
   querying a thread local variable based at least in part on receiving the request, wherein the thread local variable comprises a reference to a cryptographic provider; and
   determining, based at least in part on querying the thread local variable, that the tenant is limited to using the designated set of cryptographic operations associated with the cryptographic provider in accordance with the cryptographic operation validation policy associated with the tenant.

3. The method of claim 2, further comprising:
   releasing a thread associated with the execution of the designated version of the cryptographic operation in response to returning the result, wherein releasing of the thread includes releasing the thread local variable.

4. The method of claim 1, further comprising:
   receiving, from the application, a second request to perform a second cryptographic operation;
   determining, based at least in part on receiving the second request, that the tenant is limited to using the designated set of cryptographic operations;
   determining that the second cryptographic operation is an invalid request according to the cryptographic operation validation policy; and
   returning an error indicating that the requested second cryptographic operation fails to satisfy the cryptographic operation validation policy associated with the tenant.

5. The method of claim 1, further comprising:
   replacing the designated set of cryptographic operations with an updated designated set of cryptographic operations, an alternate designated set of cryptographic operations from a vendor, or any combination thereof.

6. The method of claim 5, wherein the designated set of cryptographic operations is replaced at the virtual machine without modifying one or more code sets associated with the application.

7. The method of claim 1, further comprising:
   receiving, from a second application associated with a second tenant, a second request to perform a second cryptographic operation;
   determining, based at least in part on receiving the second request, that the second tenant is not subject to the cryptographic operation validation policy; and
   executing the second cryptographic operation at the virtual machine based at least in part on determining that the second tenant is not subject to the cryptographic operation validation policy.

8. The method of claim 1, wherein the virtual machine operates according to a virtual machine configuration specifying that the virtual machine is configured to execute only cryptographic operations that are validated in accordance with the cryptographic operation validation policy, wherein the tenant is limited to using the designated set of cryptographic operations based at least in part on the virtual machine configuration.

9. The method of claim 1, wherein the virtual machine is a Java virtual machine.

10. The method of claim 1, wherein the cryptographic operation validation policy comprises a Federal Information Processing Standard Publication 140.

11. The method of claim 1, wherein the version of the cryptographic operation comprises a first hashing function, a first algorithm, or both that is at least partially different from a second hashing function, a second algorithm, or both of the designated version of the cryptographic operation.

12. An apparatus for data processing, comprising:
    a processor;
    memory coupled with the processor; and
    instructions stored in the memory and executable by the processor to cause the apparatus to:
        receive, from an application associated with a tenant and at a virtual machine, a request to perform a version of a cryptographic operation for the application at the virtual machine;
        determine, based at least in part on receiving the request, that the tenant is limited to using a designated set of cryptographic operations in accordance with a cryptographic operation validation policy associated with the tenant, and wherein the designated set of cryptographic operations are validated in accordance with the cryptographic operation validation policy;
        identify a designated version of the cryptographic operation, from the designated set of cryptographic operations, that corresponds to the cryptographic operation indicated by the request and is different than the version of the cryptographic operation indicated by the request, the designated version of the cryptographic operation in satisfaction of the cryptographic operation validation policy associated with the tenant;
        execute the designated version of the cryptographic operation at the virtual machine; and
        return, to the application, a result of executing the designated version of the cryptographic operation.

13. The apparatus of claim 12, wherein the instructions are further executable by the processor to cause the apparatus to:
    query a thread local variable based at least in part on receiving the request, wherein the thread local variable comprises a reference to a cryptographic provider; and
    determine, based at least in part on querying the thread local variable, that the tenant is limited to using the designated set of cryptographic operations associated with the cryptographic provider in accordance with the cryptographic operation validation policy associated with the tenant.

14. The apparatus of claim 13, wherein the instructions are further executable by the processor to cause the apparatus to:
    release a thread associated with the execution of the designated version of the cryptographic operation in response to returning the result, wherein releasing of the thread includes releasing the thread local variable.

15. The apparatus of claim 12, wherein the instructions are further executable by the processor to cause the apparatus to:
    receive, from the application, a second request to perform a second cryptographic operation;
    determine, based at least in part on receiving the second request, that the tenant is limited to using the designated set of cryptographic operations;
    determine that the second cryptographic operation is an invalid request according to the cryptographic operation validation policy; and
    return an error indicating that the requested second cryptographic operation fails to satisfy the cryptographic operation validation policy associated with the tenant.

16. The apparatus of claim 12, wherein the instructions are further executable by the processor to cause the apparatus to:
    replace the designated set of cryptographic operations with an updated designated set of cryptographic operations, an alternate designated set of cryptographic operations from a vendor, or any combination thereof.

17. The apparatus of claim 16, wherein the designated set of cryptographic operations is replaced at the virtual machine without modifying one or more code sets associated with the application.

18. The apparatus of claim 12, wherein the instructions are further executable by the processor to cause the apparatus to:
receive, from a second application associated with a second tenant, a second request to perform a second cryptographic operation;
determine, based at least in part on receiving the second request, that the second tenant is not subject to the cryptographic operation validation policy; and
execute the second cryptographic operation at the virtual machine based at least in part on determining that the second tenant is not subject to the cryptographic operation validation policy.

19. The apparatus of claim 12, wherein the virtual machine operates according to a virtual machine configuration specifying that the virtual machine is configured to execute only cryptographic operations that are validated in accordance with the cryptographic operation validation policy, wherein the tenant is limited to using the designated set of cryptographic operations based at least in part on the virtual machine configuration.

20. A non-transitory computer-readable medium storing code for data processing, the code comprising instructions executable by a processor to:
receive, from an application associated with a tenant and at a virtual machine, a request to perform a version of a cryptographic operation for the application at the virtual machine;
determine, based at least in part on receiving the request, that the tenant is limited to using a designated set of cryptographic operations in accordance with a cryptographic operation validation policy associated with the tenant, and wherein the designated set of cryptographic operations are validated in accordance with the cryptographic operation validation policy;
identify a designated version of the cryptographic operation, from the designated set of cryptographic operations, that corresponds to the cryptographic operation indicated by the request and is different than the version of the cryptographic operation indicated by the request, the designated version of the cryptographic operation in satisfaction of the cryptographic operation validation policy associated with the tenant;
execute the designated version of the cryptographic operation at the virtual machine; and
return, to the application, a result of executing the designated version of the cryptographic operation.

* * * * *